Sept. 25, 1934.  D. P. CARTWRIGHT  1,974,844
THERMALLY CONTROLLED MECHANISM
Filed March 7, 1933  2 Sheets-Sheet 1
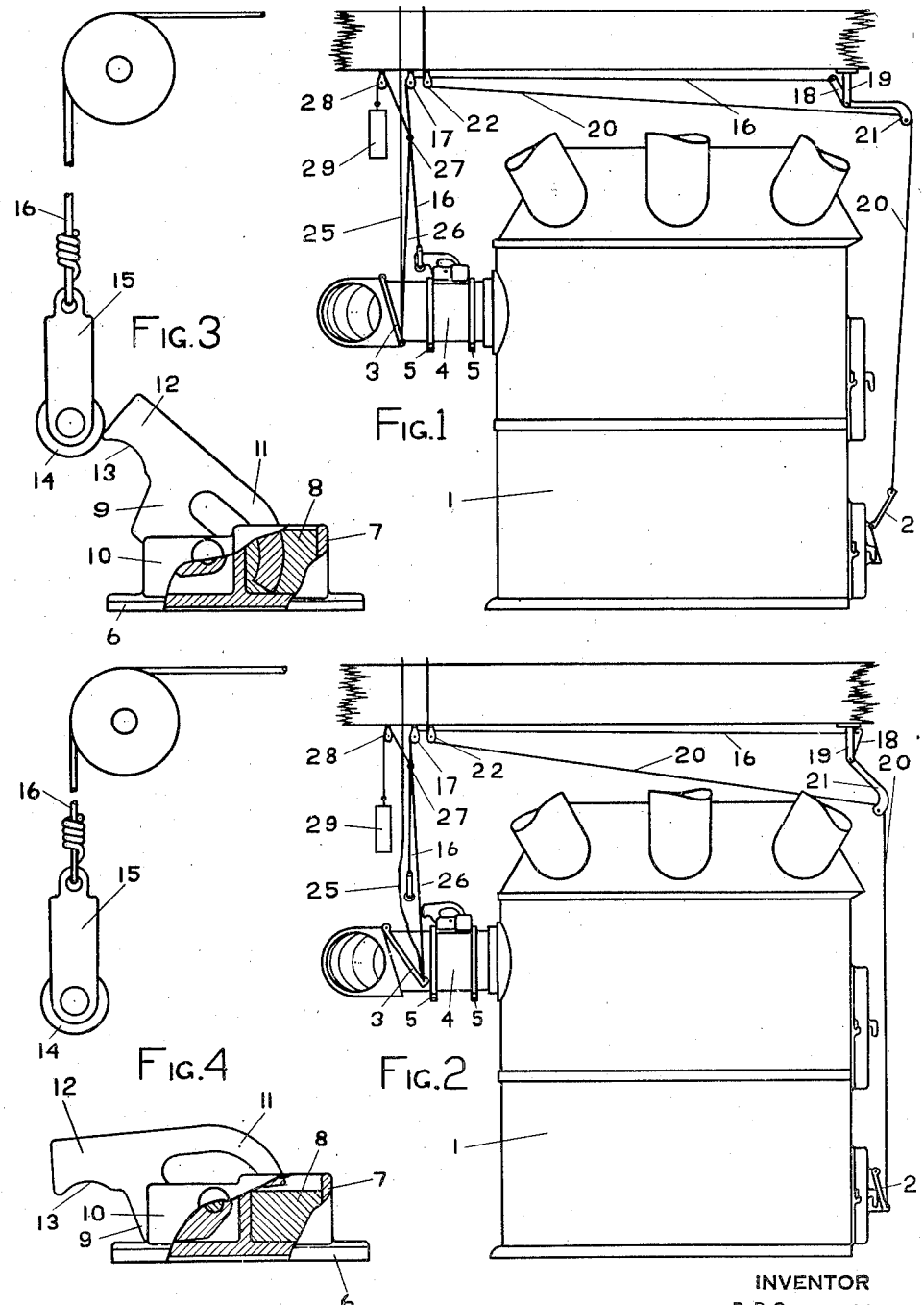
INVENTOR
D. P. Cartwright
BY Harold E. Stonebraker,
ATTORNEY Sept. 25, 1934.   D. P. CARTWRIGHT   1,974,844
THERMALLY CONTROLLED MECHANISM
Filed March 7, 1933   2 Sheets-Sheet 2
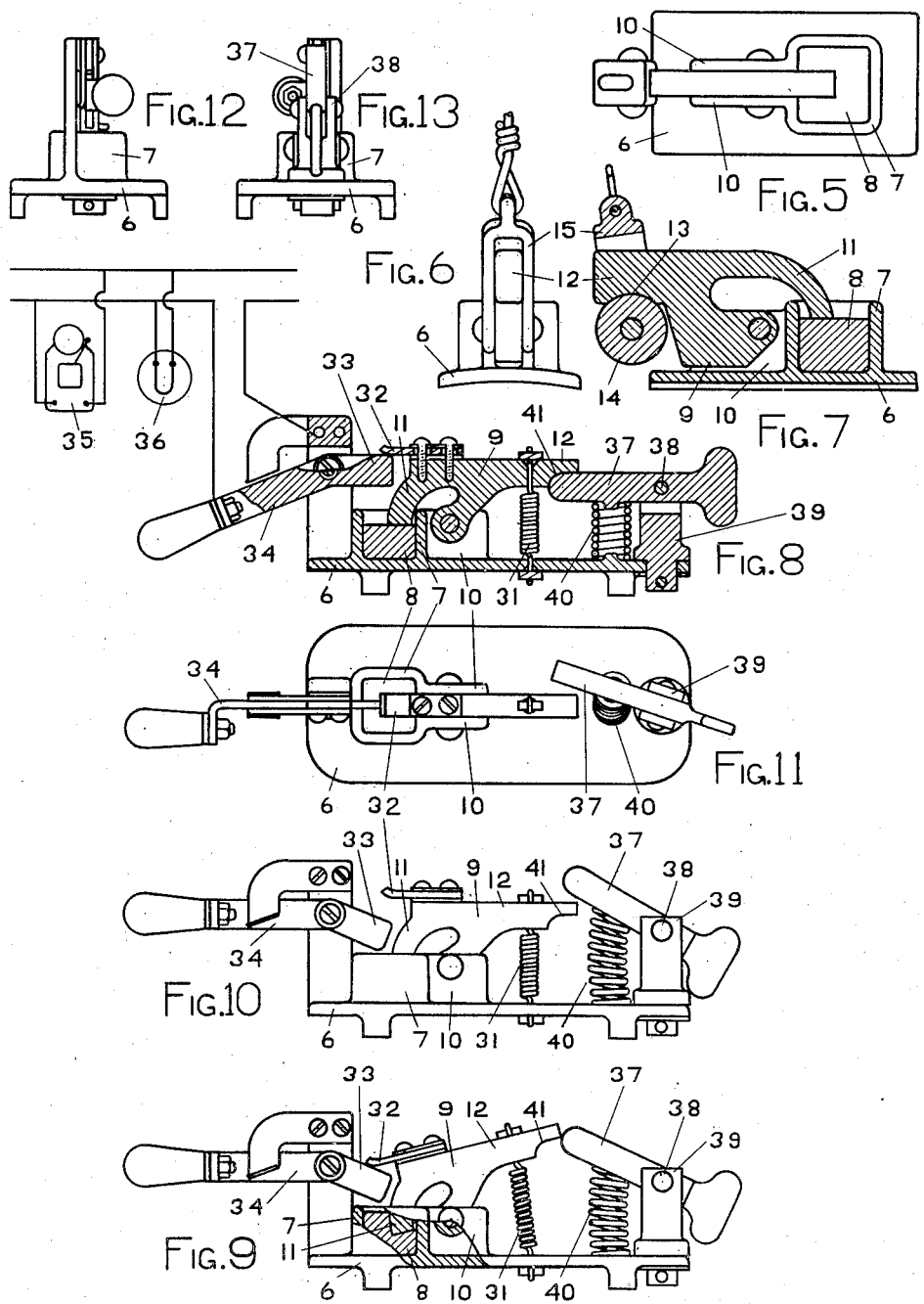

Patented Sept. 25, 1934

1,974,844

UNITED STATES PATENT OFFICE 1,974,844

THERMALLY CONTROLLED MECHANISM

Dale P. Cartwright, Rochester, N. Y.

Application March 7, 1933, Serial No. 659,948

5 Claims. (Cl. 74—2)

This invention relates to thermally controlled mechanism, and has for its purpose to afford a simple structure of few parts that is reliable in its operation and can be utilized for automatically controlling the draft doors of a furnace, or for automatically operating a signal or indicator, or bringing about any other desired function when the controlling temperature reaches a predetermined point.

More particularly, the invention is intended to provide a thermally controlled mechanism dependent upon the use of an alloy or substance that is solid below a predetermined temperature and is fusible above such temperature, the object being to utilize the fusing of such material to release and permit movement of a control device which may either free or liberate certain operating mechanism, or may cause positive movement of operating mechanism.

Still another object of the invention is to afford an apparatus of this general character in which the fusible material is arranged in a chamber or container so that when it is in solid form, the control device contacts with the upper surface of the substance and is thereby limited against downward movement, and when the fusible substance becomes liquid due to a higher temperature, the control member is released and moves downwardly into the liquid substance within the container.

A further object of the invention is to provide such a structure with a chamber and fusible substance therein in conjunction with a control device that is automatically restored to its normal position immediately after the desired function or operation is performed so that the fusible mass may immediately solidify upon lowering of the temperature with the control device in its normal or uppermost position.

To these and other ends the invention in its preferred embodiments consists in the arrangement and combinations of parts shown in the accompanying drawings, as will be hereinafter more particularly described, the novel features being pointed out in the claims following the specification.

In the drawings:

Fig. 1 is a side elevation illustrating one embodiment of the invention as applied to a furnace, and showing the control device in normal position with the main draft door open and the check damper closed;

Fig. 2 is a similar view showing the position of the parts after they have been released by movement of the control device upon fusing and liquefying of the alloy or other substance;

Fig. 3 is an enlarged partial side elevation, with parts appearing in section, showing the control device at the limit of its downward movement after being released and the corresponding positions of the affected parts;

Fig. 4 is a view similar to Fig. 3 with the control device restored to its normal position and the connected parts in their released positions before being restored;

Fig. 5 is an enlarged detail plan view of the control device in its normal position and the base or support on which it is mounted;

Fig. 6 is an end elevation of the same;

Fig. 7 is a longitudinal vertical sectional view taken centrally of Fig. 5;

Fig. 8 is a sectional view of a modified adaptation of the invention when used for operating a signal or indicator, and illustrating the parts in normal position;

Fig. 9 is a side elevation, partially in section, of the parts illustrated in Fig. 8, illustrating their position immediately after the control device has been operated upon its release by the fusing of the alloy or other substance;

Fig. 10 is a side elevation of the same structure and showing the parts in the position of Fig. 9, with the control device restored to its normal position;

Fig. 11 is a plan view of the structure illustrated in Fig. 10, showing the position of the actuating member when it is moved to restore it to normal position with reference to the control device;

Fig. 12 is an end elevation of the parts shown in Fig. 10 looking from left to right, and Fig. 13 is a similar view looking in the opposite direction.

The invention is susceptible of a wide variety of applications embodied in different structures, and it is to be understood that the forms herein disclosed are intended only as illustrative of the principles and do not limit the invention to the particular structures or arrangements set forth.

Referring more particularly to the drawings, and first to the embodiment illustrated in Figs. 1 to 7 inclusive, 1 designates a conventional type of furnace having a draft door 2, check damper 3 and smoke pipe 4 upon which the control device is preferably mounted in order to be at a point most susceptible to temperature changes, so that upon an excessive or dangerous rise of temperature within the smoke pipe, the draft to the furnace is automatically cut off through operation of the control device now to be described.

Secured to the smoke pipe in any suitable manner, as by means of straps 5, is a base or support 6 provided with a chamber or receptacle preferably formed by the upstanding integral wall 7, and within such receptacle is arranged a body 8 of fusible material such as an alloy, wax or other suitable substance adapted to liquefy readily at or above a given temperature. The chamber 7 is of greater capacity than the body of fusible material, so that when the control device enters the chamber, the fusible substance will not overflow.

Operatively arranged in conjunction with the chamber 7 is a movable control device which is preferably pivotally mounted for movement into the fusible substance, and in the embodiment illustrated, such control device includes a body portion 9 pivotally mounted between the upstanding walls 10 of the base 6, a forward extension or tongue 11 movable into the receptacle 7, as shown in Fig. 3, and a tail piece 12 which is normally engaged with parts that hold the draft controls in the position shown in Fig. 1.

The tail piece 12 has a curved recess 13 that embraces a pulley 14 when the control device is in normal position, as shown in Fig. 7, and thus holds the parts connected to pulley 14 against movement. The pulley 14 is mounted in a block 15 that is connected to a cable or cord 16, the latter being guided over pulley 17 and connected to the arm 18 of a bell crank which is pivoted to the hanger 19, see Figs. 1 and 2. 20 designates a cable or cord connected with the main draft door 2 and extending around a pulley or guide on the arm 21 of the bell crank, thence around pulley 22 to any convenient point in the building for manual operation to control the position of the draft door 2. With this arrangement, the door 2 can be closed at any time by releasing the cable 20, but when in open position, if the cable 16 is released upon operation of the thermostatic mechanism already described, the arm 18 of the bell crank is released and this permits the arm 21 to drop and the door 2 to close due to the weight of the latter, as shown in Fig. 2.

The check damper 3 has connected thereto a cord or cable 25 that extends upwardly into the building for manual control and a second cord or cable 26 that is connected to cable 16 at 27 and extends thence over pulley 28 and carries at its end the weight 29. With this arrangement, the check damper 3 can be opened manually at any time but when closed, as in Fig. 1, if the thermal mechanism is operated as already described, and pulley 14 released, the weight 29 drops to the position shown in Fig. 2 and thereby opens the check damper 3.

The pulley 14 and cable 16 are released to permit the operations just described, when the temperature at the smoke pipe rises sufficiently to fuse and liquefy the substance in receptacle 7 and permit the control device to drop downwardly, as shown in Fig. 3, thus disengaging the tail piece from the pulley 14. It is desirable that the control device automatically return immediately to its normal position illustrated in Fig. 4, and this is accomplished by so constructing and mounting the control device that the greater part of its weight is to the left of its pivotal axis. As long as the fusible mass 8 is solid, it holds the parts in the position shown in Fig. 7 but when the temperature at the smoke pipe rises sufficiently to liquefy the mass 8, it no longer holds the control device. The weight 29 and the weight of the draft door 2 are then sufficient, acting upwardly on pulley 14, to elevate the left hand end of the control device and force its tongue 11 into the liquefied mass, as shown in Fig. 3. As soon as pulley 14 rises high enough to permit the tail piece 12 to clear it, the weight of the tail piece and the main body of the control device is sufficient to cause it to fall and lift the tongue 11 out of the liquefied mass 8, restoring the control device to its normal position, as shown in Fig. 4. After the mass 8 has again solidified, the other parts are restored to normal position by manually drawing the pulley 14 downwardly and positioning it under the tail piece 12 in engagement with the curved surface 13, as shown in Fig. 7, and the parts are then in readiness for a repetition of the operation already described.

Such a structure is useful in protecting a furnace against overheating if the drafts are inadvertently left open, and eliminates the necessity for complicated and expensive electrical or motor controlled mechanisms designed for this purpose. It is dependable in operation, readily set, and can be easily applied to the smoke pipe of any furnace or boiler.

The invention can also be used advantageously in the operation of an alarm or signal following a predetermined change in temperature conditions at any given point, and to accomplish such purpose, I may employ a modification such as illustrated in Figs. 8 to 13 in which the base plate, receptacle, fusible substance and control device are generally of the same form as already described. The control device, instead of being returned to normal position by its own weight, may be held in normal position by a spring 31 connecting the base plate and the tail piece of the control device and holding the latter normally in the position shown in Fig. 8. The control device carries a plate 32 that is fixedly attached thereto and engageable with an extension 33 on a switch 34, the latter controlling an electric circuit including a bell or alarm 35 and a conventional signal 36.

The control device is moved downwardly, when the fusible mass is liquefied, by means of an actuator 37 that is pivoted at 38 in a post 39 mounted on the base plate, and 40 is a spring located between the base plate and the actuator 37 and tending to move the latter upwardly to the position shown in Fig. 10. The inner end of the actuator 37 normally engages a curved recess 41 formed on the under side of the control device at its rear end, the parts being then in the position shown in Fig. 8.

The spring 40 tends to throw the inner end of the actuator and the overlying portion of the control device upwardly, but such movement is normally prevented because the tongue of the control device is in contact with the top surface of the fusible mass, which when solid prevents downward movement of the tongue. As soon as the temperature rises sufficiently to liquefy the mass, there is no further resistance to the downward movement of the control device, and the spring 40 then acts to move the actuator 37 upwardly, as shown in Fig. 9. This movement causes the adjacent part of the control device to be forced upwardly and its other end downwardly into the fusible mass, during which movement the plate 32 actuates the extension 33 of the switch 34 and thus closes the circuit to the alarm 35 and signal 36. The parts are then in the position illustrated in Fig. 9, but as soon as the actuator 37 clears the tail piece of the control device, the spring 31 restores the latter to its normal position shown in Figs. 8 and 10.

To reset the parts, the switch 34 can be moved manually back to the position of Fig. 8 to open the controlled circuit and the actuator 37 is returned to its normal position under the control device by swinging it first to one side, as shown in Fig. 11, then downwardly to compress the spring 40, and thence under the control device to the position shown in Fig. 8. This manual setting operation of the actuator 37 is permitted since the post 39 in which it is pivotally mounted is supported in the base plate so as to permit the necessary turning movement of the post and of the actuator 37, as shown in Fig. 11.

While the invention has been herein described with reference to two possible structural embodiments, it is not confined in its application to these particular forms but may be modified as to arrangement or details without departing from the underlying principle of the improvement, and this application is intended to cover any changes or departures coming within the purposes of the invention or the scope of the following claims.

I claim:

1. A thermally controlled mechanism comprising a chamber containing a fusible mass, a pivoted control device having a portion movable into said chamber and held normally against such movement when the fusible mass is in solid form, means connected to a part to be controlled and normally engaged and held by said control device, said means being released when the control device moves into the aforesaid chamber, the control device being weighted to restore it automatically to normal position.

2. A thermally controlled mechanism comprising a chamber containing a fusible mass, a pivoted control device having a tongue movable into said chamber, the end of said tongue being engaged and held against movement by the fusible mass when the latter is in solid form, a tail piece, means connected to a part to be controlled and normally engaged by said tail piece, said means being disengaged by the tail piece and released when said tongue moves into the fused mass in the chamber, the weight of the control device being so distributed with reference to its pivotal point as to restore it to normal position when the aforesaid connecting means is released.

3. A thermally controlled mechanism comprising a chamber containing a fusible mass, a control device pivoted to swing about a horizontal axis and having a tongue movable into said chamber, the end of said tongue being engaged and held by the fusible mass when the latter is in solid form, a tail piece on the control member, and means engageable with the tail piece for swinging the control member and moving said tongue into the fusible mass, said last mentioned means being releasable from the tail piece and the weight of the control member being so distributed as to restore it to normal position when said means is released.

4. A thermally controlled mechanism comprising a chamber containing a fusible mass, a pivoted control device having an integral curved tongue movable into said chamber, the end of the tongue being engaged and held against movement by the fusible mass when the latter is in solid form, a tail piece adapted to engage and hold a connecting means against movement, said connecting means being releasable from the tail piece and the weight of the control device being so distributed with reference to its pivotal axis as to restore it to normal position when said connecting means is released.

5. A thermally controlled mechanism comprising a chamber containing a fusible mass, a control device pivoted to swing about a horizontal axis and having an integral curved tongue movable into said chamber, said tongue being normally engaged and held against movement by the fusible mass when the latter is in solid form, a tail piece, and releasable means engageable with said tail piece for swinging the control member and moving said tongue into the fusible mass, the control member being automatically restored to normal position when said means is released from the tail piece.

DALE P. CARTWRIGHT.